United States Patent
Yoshiro

[11] 3,774,675
[45] Nov. 27, 1973

[54] ROTARY HEAT-ACCUMULATIVE REGENERATOR FOR GAS TURBINE ENGINES

[75] Inventor: Sakaki Yoshiro, Yokohama, Japan

[73] Assignee: Nissan Motor Company, Limited, Kanagawa-ku, Yokohama City, Japan

[22] Filed: Aug. 5, 1971

[21] Appl. No.: 169,405

[30] Foreign Application Priority Data
Oct. 27, 1970 Japan.............................. 45/94131
Oct. 27, 1970 Japan.............................. 45/94133

[52] U.S. Cl..................... 165/8, 64/30 E, 165/7
[51] Int. Cl............................................ F28d 19/04
[58] Field of Search ................... 165/8, 7, 9, 10; 64/30 E, 30 LB

[56] References Cited
UNITED STATES PATENTS
3,296,829  1/1967  Williams ............................ 165/8 X
1,482,402  2/1924  Lamb ................................. 64/30 LB
2,977,096  3/1961  Evans ................................. 165/7

FOREIGN PATENTS OR APPLICATIONS
244,182  3/1963  Australia ............................. 165/8

Primary Examiner—Albert W. Davis, Jr.
Attorney—Robert E. Burns et al.

[57] ABSTRACT

A rotary heat-accumulative regenerator for gas turbine engines, including a rotatable heat-accumulator which is resiliently supported on a rotary shaft by means of compression springs mounted in longitudinal grooves in the shaft whereby shocks and impact invited by a driving force transferred to the heat-accumulator is absorbed by the springs. The rotary shaft may preferably be positioned in a path of cool air so that bearing associated with the shaft as well as the springs are isolated from heat in hot turbine exhaust. To this end the shaft may be hollowed to provide an internal passage through which air is passed to internally cool the shaft.

8 Claims, 5 Drawing Figures

PATENTED NOV 27 1973 3,774,675

ROTARY HEAT-ACCUMULATIVE REGENERATOR FOR GAS TURBINE ENGINES

This invention relates to gas turbine engines and more particularly to rotary heat-accumulative regenerator or matrix for use in the gas turbine engines.

Regenerators or heat exchangers are used in specific types of gas turbine engines for transferring heat from the turbine exhaust to the air leaving the compressors so as to increase performance efficiency of the gas turbine engines. Such regenerators include heat-accumulators through which the heat is transferred. Because the heat-accumulators are required to withstand rapid large temperature changes and to have low pressure drop, the heat-accumulators are usually made of porous materials such as ceramics. The regenerator to which this invention appertains is specifically of the type wherein the heat-accumulator is rotatable with a rotary shaft on which the heat-accumulator is supported. The heat-accumulator, which is in a disc form, is driven for rotation either by means of the rotary shaft or by an externally toothed ring gear with which the heat-accumulator engages along its outer rim. Since, in this instance, the material making up the heat-accumulator is considerably susceptible to mechanical shocks and impact, it is important that the heat-accumulator be protected from destruction and damage resulting from the shocks and impact caused by a driving force transferred to the heat-accumulator during operation.

It is, therefore, an object of this invention to provide an improved rotary regenerator for gas turbine engines wherein the rotatable heat-accumulator is prevented from being subject to shocks and impact invited by a driving force transferred to the heat-accumulator.

Another object of the invention is to provide an improved rotary regenerator having a rotatable heat-accumulator which is efficiently freed of shocks and impact resulting from a driving force transferred thereto and which has a simple and economical construction adapted for commercial production on a large scale.

The rotary regenerator or matrix to achieve these objects includes a rotatable heat-accumulator in an annular form to provide a central opening, and a rotary shaft which is passed through this central opening. The opening is defined by an inner peripheral wall of the heat-accumulator and this inner peripheral wall has a diameter which is slightly larger than an outside diameter of the rotary shaft, providing an annular allowance between the inner peripheral wall of the heat-accumulator and the peripheral wall of the shaft. The shaft has formed in its peripheral wall a plurality of longitudinally extending and circumferentially equidistantly spaced grooves facing the inner peripheral wall of the heat-accumulator. A plurality of pads are respectively slidably received in these grooves and are directed radially of the shaft. Compression springs are seated at one end on bottoms of the grooves and at the other on inner ends of the pads whereby the pads are pressed upon the inner peripheral wall of the heat-accumulator. With this arrangement of the rotary regenerator, the heat-accumulator is resiliently supported on the rotary shaft so that, when driven by the rotary shaft or a driving ring gear engaging with the outer peripheral wall of the heat-accumulator, the mechanical shocks and impact created by the driving force carried to the heat-accumulator is absorbed by the compression springs in whichever direction the shocks and impact may be exerted.

Where the heat-accumulator is driven by the ring gear engaging with the outer peripheral wall thereof, the rotary shaft is rotatably supported on a stationary support structure of the turbine engine through bearings. Since, in this instance, the heat-accumulator is subject to extremely high temperatures usually ranging from 300° to 600°C, these bearings and the springs which are fitted in the grooves in the rotary shaft are heated and liable to deteriorate.

It is, therefore, a further object of this invention is to provide an improved rotary regenerator in which not only the heat-accumulator is prevented from being subject to shocks and impact but the bearings and the aforesaid springs are prevented from being heated to such an extent as to deteriorate.

To achieve this additional object, the rotary regenerator embodying this invention preferably has its inner peripheral wall and accordingly its rotary shaft lcoated in the path of the relatively cool air sent from the compressor so that the shaft is substantially isolated from the heat in the turbine exhaust. If further preferred, the rotary shaft may be hollowed to provide an internal passage longitudinally extending throughout the length of the shaft whereby the air from the compressor is passed through the shaft to internally cool the shaft constantly. Introduction of the air through the passage in the shaft is facilitated by the pressure drop of the air across the heat-accumulator.

Figure 1:
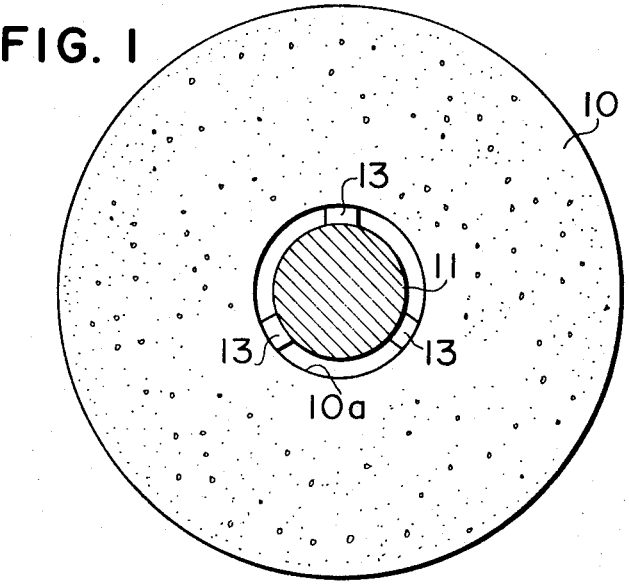
FIG. 1 is a front end view showing, partly in cross section, a first preferred embodiment of this invention.
Figure 2:
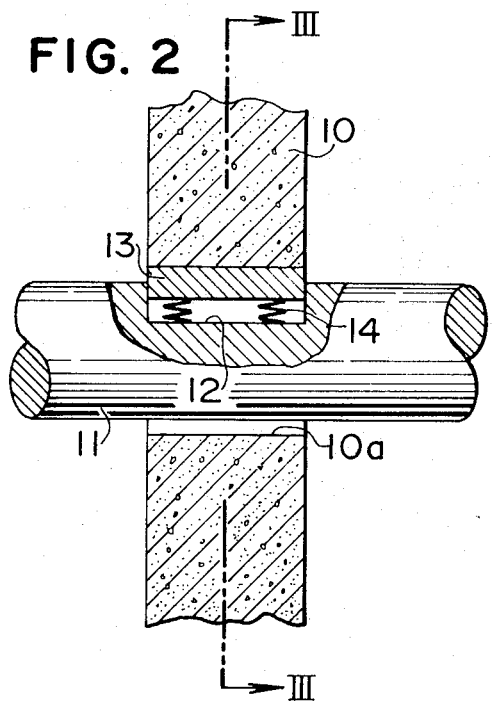
FIG. 2 is a fragmentary cross sectional view of the embodiment shown in FIG. 1.
Figure 3:
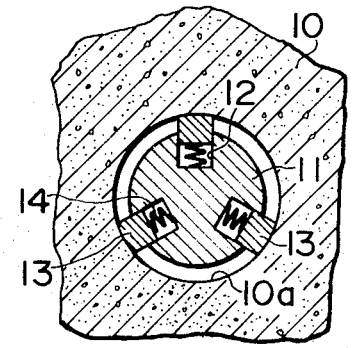
FIG. 3 is a sectional view taken on line III—III of FIG. 2.

Referring first to FIGS. 1 to 3, the rotary regenerator implementing this invention includes a rotatable heat-accumulator 10 in an annular form providing a central opening 10a and a rotary shaft 11 which is passed through this opening. The opening 10a is defined by an inner peripheral wall of the annular heat-accumulator and this inner peripheral wall has a diameter which is slightly larger than the outside diameter of the rotary shaft 11 so as to provide an annular allowance which is defined by the inner peripheral wall of the heat-accumulator 10 and the peripheral wall of the rotary shaft 11. As seen in FIGS. 2 and 3, the rotary shaft 11 has formed in its peripheral wall a plurality of longitudinally extending circumferentially equidistantly spaced grooves 12. These grooves 12 are herein illustrated as three in number by way of example, but the number of the grooves may be seelcted at will depending upon the operation requirements. The grooves 12 receive therein friction pads 13 which are directed radially of the rotary shaft 11 as best seen in FIG. 3. On bottoms of the grooves 12 and inner ends of the pads 13 are seated compression springs 14, forcing the pads pressing upon the inner peripheral wall of the heat-accumulator 10 at their outer ends. The heat-accumulator 10 is in this manner resiliently supported on the rotary shaft 11. The heat-accumulator 10, rotary shaft 11 and pads 13 rotate together by means of frictional forces exerted between outer ends of the pads and the inner peripheral wall of the heat-accumulator 10.

The pads 13 may preferably be made of carbon.

The heat-accumulator 10 is driven for rotation with the rotary shaft 11 by means of the shaft 11 itself or by an externally toothed ring gear engaging with the outer peripheral wall of the heat-accumulator and driven by a suitable driving means. In the event mechanical shocks are created by a driving force to be transferred to the heat-accumulator 10 during operation, the shocks are absorbed by the compression springs 14 so that the heat-accumulator can be prevented from being subjected to the any shocks which may be exerted.

Where the heat-accumulator 10 is driven for rotation by the ring gear, the rotary shaft 11 is usually supported on a stationary support structure of the turbine engine through bearings, though not shown. In case these bearings stick to the shaft 11 in the existing rotary regenerators in which the heat-accumulator is directly connected to the shaft, an undue force is applied to the heat-accumulator which consequently is liable to fail. With the arrangement proposed by this invention in which the heat-accumulator 10 is supported on the shaft 11 resiliently by means of the pads 13 which are in pressing engagement with the inner peripheral wall of the heat-accumulator, the pads are caused to slide in the grooves 12 to permit the heat-accumulator to move relatively to the shaft when such undue force is applied to the heat-accumulator in the event the bearings stick to the shaft. The undue force is in this manner eliminated so that the heat-accumulator is prevented from being damaged.

Figure 4:
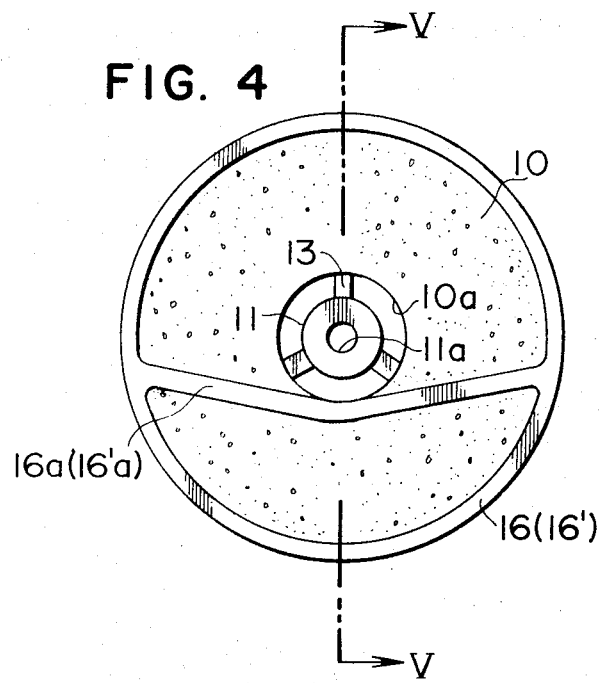
FIG. 4 is a front end view showing a second preferred embodiment of this invention.
Figure 5:
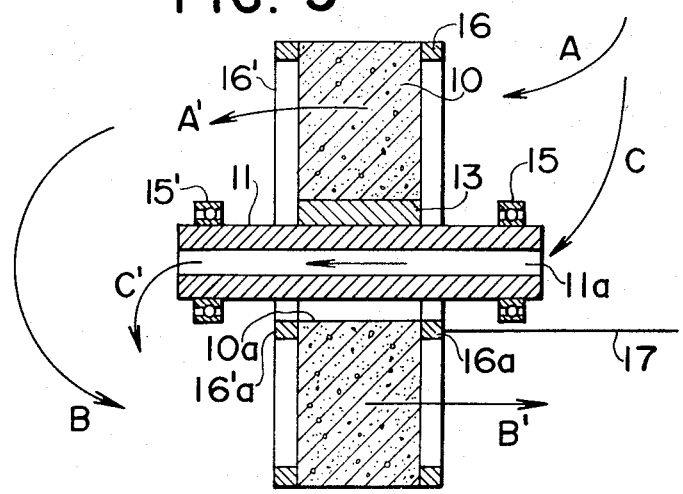
FIG. 5 is a sectional view taken on line V—V of FIG. 4.

FIGS. 4 and 5 now illustrate a second preferred embodiment of this invention, which is adapted to not only protect the heat-accumulator from shocks and impact but prevent the bearings and compression springs from being subject to heat which would otherwise be transferred thereto from the hot turbine exhaust passed through the heat-accumulator during operation.

Thus, the heat-accumulator 10 of this second embodiment is driven by an external driving ring gear (not shown) engaging with the outer peripheral wall of the heat-accumulator 10, while the rotary shaft 11 is rotatably supported on a stationary support structure (not shown) of the turbine engine through bearings 15 and 15' shown in FIG. 5.

The rotary regenerator is herein shown as including a pair of seals 16 and 16' which are in sliding engagement with both sides of the heat-accumulator 10. The seals 16 and 16' per se are well known in the art and limit the paths of the two, cool and hot, fluids passed through the heat-accumulator. In the shown embodiment, seals 16 and 16' include partitioning seals 16a and 16'a respectively, which extend off the center of the heat-accumulator 10 so that the rotary shaft 11 is located in the path of the air from the compressor. Designated by reference numeral 17 is partition plate separating the paths of the incoming air and the outgoing turine exhaust. If desired, the rotary shaft 11 may be hollowed to provide an internal passage or throughbore 11a extending from one end of the shaft to the other, whereby the incoming air is passed through the shaft and functions as a coding medium to internally cool the shaft constantly.

As the heat-accumulator 10 is rotated with the rotary shaft 11 at a certain speed, say about 30 r.p.m. for instance, the incoming air from the compressor is sent to the heat-accumulator 10 in the direction of arrow A and leaves the same in the direction of arrow A', as indicated in FIG. 5. The outgoing air is passed over to the turbine (not shown) and returned as the hot exhaust. The incoming turbine exhaust enters the heat-accumulator in the direction of arrow B and discharged therefrom in the direction of arrow B'. The heat in the turbine exhaust is transferred to and stored by the rotating heat-accumulator 10. The heat which the heat-accumulator has received in a given angular position relative to the seal 16 is largely consumed to heat the cool air when the heat-accumulator 10 is rotated to a diametrically opposed angular position in which the heat-accumulator receives the air fed from the compressor.

Because, in this condition, the rotary shaft 11 is located in the path of the air from the compressor and isolated from the path of the hot turbine exhaust by means of the partitioning seals 16a and 16'a, the shaft is only subject to the heat in the outgoing air so that the bearings 15 and 15' and the compression springs 14 are prevented from being heated to such an extent as to deteriorate. Where, moreover, the rotary shaft 11 is hollowed to provide the passage 11a by preference, a portion of the incoming air is admitted to this passage as indicated by arrow C to internally cool the shaft. The air leaving the passage 11a in the direction of arrow C' is passed to the combustion chamber (not shown) together with the air passing in the direction of arrow A' and returned to the heat-accumulator 10 as the turbine exhaust as indicated by arrow B. The air in the passage 11a, in this instance, is drawn by means of an impetus resulting from a difference between the pressures of the air at inlet and outlet of the passage 11a due to a pressure drop of the outgoing air. The rotary shaft 11 is thus positively internally cooled by the cool air so that the springs 14 and bearings 15 and 15' are efficiently prevented from being heated excessively.

It will now be appreciated from the foregoing description that, according to one important aspect of this invention, the heat-accumulator playing a most important role in the rotary regenerator for gas turbine engines can be prevented from being damaged by mechanical shocks and impact invited by a driving force transferred to the heat-accumulator.

According to another important aspect of the invention, not only the heat-accumulator is prevented from being subject to mechanical impact but the bearings and springs associated therewith can be prevented from deterioration which would otherwise result from transference of heat thereto.

By virtue of these aspects, the rotary regenerator according to this invention is expected to find advantageous applications in gas turbine engines.

What is claimed is:

1. A rotary heat-accumulator regenerator for use with a gas turbine engine and the like comprising: a heat-accumulator disc having means defining a central opening therethrough bounded by an inner peripheral wall of said heat-accumulator disc; a rotationally driven rotatable shaft extending through said central opening and dimensioned relative thereto to define an annular space between the shaft periphery and said inner peripheral wall; means defining a plurality of longitudinally extending and circumferentially spaced-apart grooves in said shaft each facing said inner peripheral wall; a plurality of friction pads each slidably disposed in one of said grooves and slidable into said annular space to make frictional engagement with said inner peripheral wall; and a plurality of biasing means disposed in respective ones of said grooves for resiliently biasing said friction pads into frictional engagement with said inner peripheral wall with sufficient force to effect rotation of said heat-accumulator disc in response to rotation of said shaft.

2. A rotary heat-accumulator regenerator according to claim 1; wherein each biasing means comprises at least one compression spring disposed in one of said grooves and resiliently compressed between its associated friction pad and said shaft.

3. A rotary heat-accumulator regenerator according to claim 1; wherein each friction pad has an elongated configuration complementing the configuration of its associated groove.

4. A rotary heat-accumulator regenerator according to claim 3; wherein each friction pad is composed of carbon material.

5. A rotary heat-accumulator regenerator according to claim 1; wherein said shaft has means therein defining a throughbore for flowing therethrough a cooling medium during use of the regenerator.

6. A rotary heat-accumulative regenerator for gas turbine engines, including a rotatable heat-accumulator in an annular form and having therein a central opening defined by an inner peripheral wall of said heat-accumulator, a rotatable hollow shaft extending through said opening, said opening having a diameter slightly larger than that of said rotary shaft defining a ring-like space between the shaft and the inner peripheral wall, means defining a plurality of longitudinally extending and circumferentially equidistantly spaced grooves in said shaft each facing said inner peripheral wall, a plurality of pads respectively slidably received in said grooves, and a plurality of compression springs respectively placed between bottoms of said grooves and said pads for resiliently holding said pads in pressing engagement with said inner peripheral wall of said heat-accumulator.

7. A rotary heat-accumulative regenerator according to claim 6, further including a pair of seals held in sliding engagement with both sides of said heat-accumulator for locating said rotary shaft in a path of cool air to be passed through said heat-accumulator in order to isolate said shaft from the hot turbine exhaust.

8. A rotary heat-accumulative regenerator according to claim 6, in which said pads are made of carbon.

* * * * *